US008799152B2

(12) United States Patent
Keresman, III et al.

(10) Patent No.: US 8,799,152 B2
(45) Date of Patent: Aug. 5, 2014

(54) UNIVERSAL MERCHANT APPLICATION, REGISTRATION AND BOARDING PLATFORM

(75) Inventors: Michael A. Keresman, III, Kirtland Hills, OH (US); Chandra Balasubramanian, Cleveland, OH (US); Michael Roche, University Heights, OH (US); Scott Rauhe, Lakewood, OH (US)

(73) Assignee: CardinalCommerce Corporation, Mentor, OH (US)

( * ) Notice: Subject to any disclaimer, the term of this patent is extended or adjusted under 35 U.S.C. 154(b) by 50 days.

(21) Appl. No.: 13/082,004

(22) Filed: Apr. 7, 2011

(65) Prior Publication Data

US 2012/0036064 A1    Feb. 9, 2012

Related U.S. Application Data

(60) Provisional application No. 61/321,630, filed on Apr. 7, 2010.

(51) Int. Cl.
*G06Q 40/00*    (2012.01)

(52) U.S. Cl.
USPC ............................................. 705/39; 705/40

(58) Field of Classification Search
USPC .................................................... 705/10–44
See application file for complete search history.

(56) References Cited

U.S. PATENT DOCUMENTS

| | | | |
|---|---|---|---|
| 5,748,908 A * | 5/1998 | Yu | 705/44 |
| 6,332,133 B1 * | 12/2001 | Takayama | 705/39 |
| 7,051,002 B2 | 5/2006 | Keresman, III et al. | |
| 7,177,836 B1 | 2/2007 | German et al. | |
| 7,254,557 B1 * | 8/2007 | Gillin et al. | 705/40 |
| 7,502,760 B1 | 3/2009 | Gupta | |
| 7,693,783 B2 * | 4/2010 | Balasubramanian et al. | 705/38 |
| 7,716,129 B1 * | 5/2010 | Tan et al. | 705/40 |
| 7,801,826 B2 * | 9/2010 | Labrou et al. | 705/67 |
| 2003/0130958 A1 * | 7/2003 | Narayanan et al. | 705/73 |
| 2005/0071512 A1 | 3/2005 | Kim et al. | |
| 2008/0033880 A1 * | 2/2008 | Fiebiger et al. | 705/44 |
| 2008/0071640 A1 * | 3/2008 | Nguyen | 705/26 |
| 2008/0086417 A1 | 4/2008 | Bykov et al. | |
| 2008/0162371 A1 | 7/2008 | Rampell et al. | |
| 2009/0024471 A1 | 1/2009 | Nielson et al. | |
| 2009/0313147 A1 | 12/2009 | Balasubramanian et al. | |
| 2010/0057554 A1 * | 3/2010 | Lanford | 705/14.38 |
| 2010/0312702 A1 * | 12/2010 | Bullock | 705/44 |
| 2011/0191206 A1 * | 8/2011 | Kiarostami | 705/26.8 |
| 2012/0101887 A1 * | 4/2012 | Harvey et al. | 705/14.23 |
| 2012/0109674 A1 * | 5/2012 | Pitroda et al. | 705/1.1 |

OTHER PUBLICATIONS

International Search Report dated Jun. 13, 2011.

* cited by examiner

*Primary Examiner* — Frantzy Poinvil
(74) *Attorney, Agent, or Firm* — Fay Sharpe LLP

(57) ABSTRACT

A system for processing e-commerce transactions. The system includes one or more processors programmed to receive a selection of one or more alternative payment brands from a merchant. Each of said alternative payment brands including a different merchant application process. Further, the processors are programmed to receive merchant information from the merchant necessary to apply to the selected alternative payment brands and apply to each of the selected alternative payment brands using the merchant information in accordance with the merchant application process for the selected alternative payment brand.

20 Claims, 4 Drawing Sheets

UNIVERSAL MERCHANT APPLICATION, REGISTRATION AND BOARDING PLATFORM

This application claims the benefit of U.S. Provisional Application No. 61/321,630, filed Apr. 7, 2010, incorporated herein by reference in its entirety.

BACKGROUND

The present disclosure relates generally to methods and/or systems for processing electronic payments. In particular, the disclosure is directed to methods and/or systems that provide authentication support and/or other payment processing solutions for merchants conducting business, including over a telecommunications network, e.g., the Internet and wireless networks. However, it is to be appreciated that the presently disclosed subject matter is equally amenable to other like applications and/or environments, such as mobile commerce.

By way of background, Internet commerce, or e-commerce as it is otherwise known, relates to the buying and selling of products and/or services between consumers and merchants over the Internet or other like transactional exchanges of information. Mobile commerce, also known as m-commerce, is the ability to conduct commerce using a mobile device, such as a mobile phone, a Personal digital assistant (PDA), a smartphone, or other emerging mobile equipment such as dashtop mobile devices.

The convenience and availability of shopping over the Internet has sparked considerable interest in e-commerce and m-commerce on behalf of both consumers and merchants. While traditional payment options, such as credit and debit cards, still dominate e-commerce transactions, industry momentum is swinging in the direction of alternative payment options, such as GOOGLE CHECKOUT, PAYPAL EXPRESS CHECKOUT, BILL ME LATER EXPRESS and BILL ME LATER BUSINESS. By way of example, in a typical checkout flow, a buyer checks out from the shopping cart page, provides shipping information, chooses a payment option and provides billing and payment information, reviews the order and pays, receives an order confirmation. However, in a PAYPAL EXPRESS CHECKOUT flow, a buyer still checks out at the beginning of the flow. However, the buyer does not enter shipping, billing, or payment information, because PAYPAL provides the stored information. This simplifies and expedites the checkout process.

Alternative payment options enhance the consumer and merchant experience by extending the ability of consumers to buy and for merchants to accept different tenders. Also, alternative payment options further remove the merchants and the consumers from potential fraud and allow any fraudulently obtained funds to be more readily recovered. One challenge with alternative payment options, however, is that they generally use authentication, use special integration specifications, and require individual merchant underwriting. Therefore, it is challenging and/or time consuming for merchants to complete multiple applications, registration processes and then individually board (or enable) the alternative payment options.

The present invention contemplates new and improved systems and/or methods which overcome the above-referenced problems and others.

INCORPORATION BY REFERENCE

The following commonly assigned applications, the disclosures of each being completely incorporated herein by reference, are mentioned:

U.S. Pat. No. 7,051,002 entitled "Universal Merchant Platform for Payment Authentication," by Keresman, III et al.; and, U.S. Patent Publication No. 2009/0313147 entitled "Alternative Payment Implementation for Electronic Retailers," by Balasubramanian et al.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a system for processing e-commerce transactions is provided. The system includes one or more processors programmed to receive a selection of one or more alternative payment brands from a merchant. Each of said alternative payment brands including a different merchant application process. Further, the processors are programmed to receive merchant information from the merchant necessary to apply to the selected alternative payment brands and apply to each of the selected alternative payment brands using the merchant information in accordance with the merchant application process for the selected alternative payment brand.

According another aspect of the present disclosure, a method for processing e-commerce transactions is provided. A selection of one or more alternative payment brands is received from a merchant. Each of said alternative payment brands including a different merchant application process. Merchant information from the merchant necessary to apply to the selected alternative payment brands is also received. The merchant information is then used to apply to each of the selected alternative payment brands in accordance with the merchant application process for the selected alternative payment brand.

According to another aspect of the present disclosure, a system for processing e-commerce transactions is provided. The system includes a universal merchant platform (UMP) providing merchants with a single interface for processing transactions involving a plurality of different alternative payment brands. The system further includes one or more processors programmed to receive a selection of one or more alternative payment brands from a merchant. Each of said alternative payment brands including a different merchant application process. The processors are further programmed to receive merchant information from the merchant necessary to apply to the selected alternative payment brands, apply to each of the selected alternative payment brands using the merchant information in accordance with the merchant application process for the selected alternative payment brand, register the selected alternative payment brands with the UMP for the merchant, receive notice that underwriting criteria of the selected alternative payment brands have been accepted, and enable the selected alternative payment brands with the UMP for the merchant.

DETAILED DESCRIPTION

Figure 1:
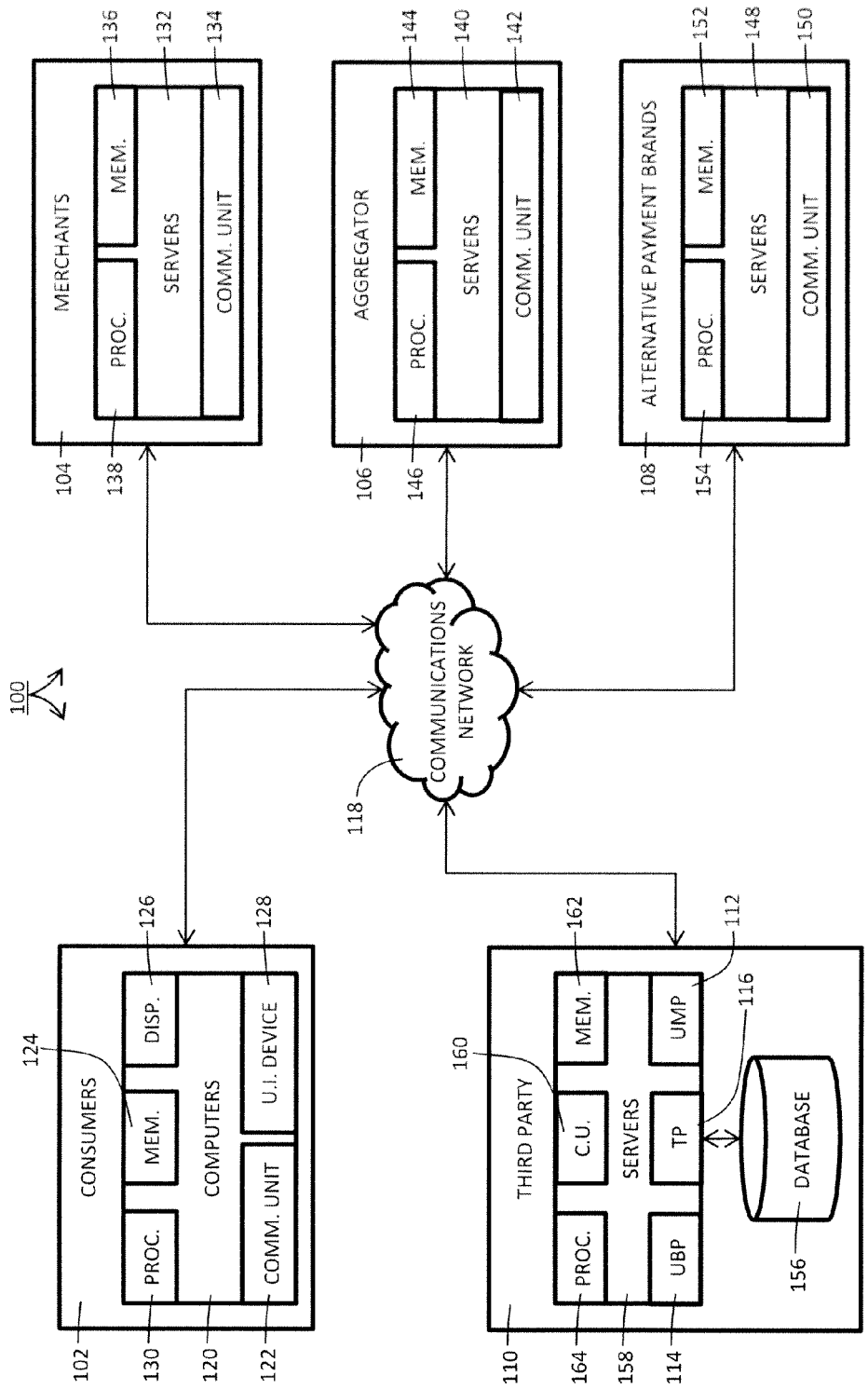
FIG. 1 is a block diagram of a system for applying to, registering and boarding alternative payment brands according to aspects of the present disclosure.

With reference to FIG. 1, a block diagram of a system 100 for applying to, registering and boarding alternative payment brands is provided. The system 100 suitably includes one or more consumers 102; one or more merchants 104; optionally, one or more aggregators 106; one or more alternative payment brands 108; and a third party 110 providing a universal merchant platform (UMP) 112, a universal boarding platform (UBP) 114, and, optionally, a test platform (TP) 116, interconnected by a communications network 118. The communications network 118 is typically the Internet, but other communications networks are contemplated. For example, the communications network 118 may include one or more of a local area network, a wireless network, and the like. Further, although the third party 110 in FIG. 1 typically provides the UMP 112, the UBP 114 and the test platform 116, it is to be understood that these platforms may be provided by different parties.

The consumers 102 electronically purchase products and/or services from the merchants 104 over the communications network 118 via graphical user interfaces, such as e-commerce and/or m-commerce websites of the merchants 104. Suitably, the consumers 102 employ web browsers to access the graphical user interfaces and purchase the products and/or services. However, it is to be appreciated that other means of electronically purchasing the products and/or services are contemplated. For example, stand alone programs embodying the graphical user interfaces can be distributed, optionally via the communications network 118, to the consumers 102. To purchase the products and/or services over the communications network 118, the consumers 102 submit a payment type to the merchants 104. A payment type includes, for example, PIN debit card, credit card, and so on.

Each of the consumers 102 is suitably embodied by a digital processing device 120, such as a computer, smart phone, PDA, and the like, connected to the communications network 118. Further, each of the digital processing devices 120 suitably includes a communications unit 122, at least one memory 124, a display 126, a user input device 128, a processor 130, and the like. The communications units 122 allow the digital processing devices 122 to interact with other components connected to the communications network 118. The memories 124 include computer executable instructions for performing the above-noted functions associated with the consumers 102. The displays 126 display the graphical user interfaces (e.g., via web browsers) facilitating consumer interaction with the digital processing devices 120. The user input devices 128 allow the consumers 102 to interact with the graphical user interfaces. The processors 130 execute the computer executable instructions on the memories 124.

The merchants 104 provide the consumers 102 the graphical user interfaces, typically via the communications network 118. For example, it is contemplated that the graphical user interfaces are e-commerce and/or m-commerce websites. The graphical user interfaces suitably allow the consumers 102 to purchase products and/or services electronically over the communications network 118 through submission of payment types. For example, the graphical user interfaces allow consumers 102 to select and submit products and/or services to purchase and select and submit a payment type for payment therefor to the merchants 104.

When a merchant receives the payment type from a consumer, the merchant submits the payment type to the UMP 112 and places the consumer in communication with the UMP 112 via, for example, an iFrame, a redirect to the UMP 112, and so on. The UMP 112 collects payment information, such as a card number and expiration date, for the payment type from the consumer and partially or wholly completes the transaction using the payment type. For example, the UMP 112 collects payment information for the payment type and processes transactions involving authenticated payment initiatives, as discussed in detail in U.S. Pat. No. 7,051,002 entitled "Universal Merchant Platform for Payment Authentication," by Keresman, III et al., incorporated herein by reference in its entirety. As another example, the UMP 112 collects payment information for the payment type and processes transactions involving alternative payment brands, as discussed in detail in U.S. Patent Publication No. 2009/0313147 entitled "Alternative Payment Implementation for Electronic Retailers," by Balasubramanian et al., incorporated herein by reference in its entirety. Although the UMP 112 can be employed to wholly complete a transaction, it is typically employed to partially complete a transaction. In that regard, the merchant suitably performs the authorization and capture of funds typical of credit card transactions and offloads, for example, authentication or payment selection to the UMP 112.

To use the UMP 112, the merchants 104 suitably register with the third party 110 providing the UMP 112. This step may include the merchants 104 providing merchant information (e.g., financial information, physical address, category of goods or services sold, Internet address, email address, etc.) to the third party 110. Typically, the merchant information is provided over the communications network 118 via a graphical user interface, such as a web interface, offered by the third party 110. However, other means of providing the merchant information, such as via a telephone, are contemplated. Additionally, the merchant information is suitably modifiable, optionally via the graphical user interface and/or the communications network 118. In certain embodiments, registration may further include signing and/or executing an agreement of the third party 110.

Further, to use the UMP 112 the merchants 104 suitably augment their graphical user interface and/or backend systems supporting the graphical user interfaces to employ the UMP 112. For example, a merchant may add a hosted iFrame linking their graphical user interface to the third party 110. Advantageously, this allows easy integration with the UMP 112, especially during the submission of payment information. In certain embodiments, the merchants 104 employ the test platform 116, discussed hereafter, to test the integration of the UMP 112 with their graphical user interface and/or backend systems.

Even more, to use the UMP 112, the merchants 104 register and/or board (or enable) one or more payment brands, such as alternative payment brands, supported by the UMP 112 with the third party 110. Registration and/or boarding suitably entails providing merchant information pertaining to the payment brands necessary to complete a transaction using a payment option of the payment brands to the third party 110. Merchant information may include, for example, a merchant account identifier of a payment brand. The merchants 104 suitably obtain the merchant information during application to the payment brands. For example, during application to an alternative payment brand, a merchant is suitably provided with merchant information to be used for completing transactions involving the alternative payment brand. Typically, the merchant information is provided over the communications network 118 via a graphical user interface, such as a web interface, offered by the third party 110. However, other means of providing the merchant information, such as via a telephone, are contemplated. The registration and/or boarding of the payment brands can be performed during and/or after registration with the UMP 112.

One or more servers 132 connected to the communications network 118 suitably embody each of the merchants 104. Each of the servers 132 includes one or more of a communications unit 134, at least one memory 136, a processor 138, and the like. The communications units 134 allow the servers 132 to interact with other components connected to the communications network 118. The memories 136 include computer executable instructions for performing the above-noted functions associated with the merchants 104. The processors 138 execute the computer executable instructions on the memories 136.

The aggregators (or gateways/processors) 106 act as agents for one or more of the merchants 104. In that regard, they process payments for the merchants, optionally, with the aid of the UMP 112. Examples of aggregators include CyberSource and First Data. Where an aggregator employs the UMP 112, it is suitably augmented to use the UMP 112 as described above in connection with the merchants 104. In certain embodiments, the aggregators 106 further provide their respective merchants with the ability to register with one or more of the alternative payment brands 108 by way of the UBP 114. In such embodiments, the aggregators 106 provide corresponding merchants with a data entry point from which to select one or more of the alternative payment brands 108 and, optionally, to enter merchant information, such as merchant legal name, merchant id, merchant bank, contact person, and so on. Typically the data entry point is a website provided via the communications network 118, but other data entry points, such as telephone based data entry points, are contemplated. Upon collecting the selection and, optionally, the merchant information, the selection and merchant information are forwarded to the UBP 114 and processed as described below.

One or more servers 140 suitably embody each of the aggregators 106. Each of the servers 140 includes one or more of a communications unit 142, at least one memory 144, a processor 146, and the like. The communications units 142 allow the servers 140 to interact with other components connected to the communications network 118. The memories 144 include computer executable instructions for performing the above-noted functions associated with the aggregators 106. The processors 146 execute the computer executable instructions on the memories 144.

The alternative payment brands 108 govern and process purchase and payment transactions. Each of the alternative payment brands 108 provides one or more alternative payment options, suitably via the UMP 112, to the merchants 104. Alternative payment brands (or online payment services) include, but are not limited to, GOOGLE, PAYPAL, BILL ME LATER, MYECHECK, AMAZON, SECURE VAULT PAYMENTS, and TELECHECK, and so on. Alternative payment options include, but are not limited to, GOOGLE CHECKOUT, PAYPAL EXPRESS CHECKOUT, BILL ME LATER EXPRESS, BILL ME LATER BUSINESS, CHECK OUT WITH AMAZON, SECURE VAULT PAYMENTS. It is to be understood that the terms "alternative payment brand" and "alternative payment option" may be used interchangeably. Each of the alternative payment brands 108 typically has its own unique alternative payment implementation, which includes, but is not limited to, a processing flow, response codes, communications protocols, message formats, and so on. In addition, each of the alternative payment brands 108 typically includes its own application process for merchants. For example, one of the alternative payment brands 108 may include a first application process and another one of the alternative payment brands 108 may include a second, different application process.

One or more servers 148 suitably embody each of the alternative payment brands 108. Each of the servers 148 includes one or more of a communications unit 150, at least one memory 152, a processor 154, and the like. The communications units 150 allow the servers 148 to interact with other components connected to the communications network 118. The memories 152 include computer executable instructions for performing the above-noted functions associated with the alternative payment brands 108. The processors 154 execute the computer executable instructions on the memories 152.

The third party 110 generally facilitates the completion of transactions between the consumers 102 and the merchants 104 by way of the UMP 112. The UMP 112 serves as a centralized merchant processing system to wholly or partially process transactions using a single platform. In that regard, it enables the merchants 104 to process a variety of different payment options with a single implementation. Moreover, it allows the use of established payment processing infrastructure to process transactions. Typically, the UMP 112 is employed for authentication in traditional card-based transactions, as discussed in U.S. Pat. No. 7,051,002 entitled "Universal Merchant Platform for Payment Authentication," by Keresman, III et al., and/or alternative payment brand transactions, as discussed in U.S. Patent Publication No. 2009/0313147 entitled "Alternative Payment Implementation for Electronic Retailers," by Balasubramanian et al. Suitably, the UMP 112 supports each of the alternative payment brands 108.

The third party 110 further facilitates the application process to the alternative payment brands 108 via the UBP 114. In that regard, the UBP 114 allows a merchant to easily apply to one or more of the alternative payment brands 108. Typically, a data entry point of the UBP 114 collects a selection of one or more of the alternative payment brands 108 from the merchant and all the necessary merchant information to apply to the selected alternative payment brands. Merchant information includes, for example, merchant legal name, merchant id, merchant bank, contact person, and so on. The necessary merchant information is suitably determined via mappings between the alternative payment brands 108 and required fields stored in a memory or database, such as a database 156. For example, a mapping may specify that an alternative payment brand requires a first field and a second field during application. Typically, the data entry point is a graphical user interface presented to the merchant by way of, for example, the communications network 118. However, other data entry points, such as telephone-based data entry points, are contemplated.

While the data entry point is typically employed to collect the selection and the merchant information, in certain embodiments, an aggregator of the merchant collects the selection and, optionally, at least some of the necessary merchant information. In such embodiments, the UBP 114 receives a selection of one or more of the alternative payment brands 108 from the aggregator and, optionally, merchant information from the aggregator. After receiving the selection from the aggregator, the UBP 114 further assesses whether the received merchant information is sufficient to register for the selected alternative payment brands. Insofar as it isn't, the UBP 114 requests any further merchant information that is necessary from the merchant through coordination with the aggregator. For example, the UBP 114 may redirect the merchant to the data entry point of the UBP 114 via the aggregator so as to collect further merchant information.

The UBP 114 suitably maintains the selection and the necessary merchant information in a memory or database, such as the database 156. Based upon the selection, the UBP 114 applies to each of the selected alternative payment brands using the necessary merchant information. Because each of the alternative payment brands 108 includes its own application process, the UBP 114 suitably includes the appropriate logic to apply to each of the selected alternative payment brands. In certain embodiments, the UBP 114 includes a sub-module for each of the alternative payment brands 108, where the sub-modules implement the application logic for corresponding alternative payment brands and provide a unified interface to the application process. In such embodiments, the appropriate sub-module is selected for each of the selected alternative payment brands. Thereafter, the necessary merchant information is provided to the selected sub-module using the unified interface.

Where additional information and/or merchant input, such as acceptance and/or acknowledgment, is required during an application process for an alternative payment brand, the data entry point is suitably employed. That is to say, the data entry point is employed to request merchant input and/or additional information. For example, where a merchant needs to accept the terms and conditions of an alternative payment brand, the data entry point can be employed to present the merchant with the terms and conditions and/or redirect the merchant to the alternative payment brand so the alternative payment brand can present the merchant with the terms and conditions. In certain embodiments, additional information collected by the data entry point is maintained in a memory, such as the database 156.

Additionally, the third party 110 may facilitate the registration and boarding of the selected alternative payment brands to the UMP 112 and/or the test platform 116 via the UBP 114 upon formal acceptance of an application for the alternative payment brands based on corresponding underwriting criteria. In certain embodiments, the UBP 114 receives notice from, for example, the selected alternative payment brands of acceptance via the communications network 118. Underwriting criteria are suitably rules specifying the criteria for acceptance of an application by the merchant. For example, the underwriting criteria may specify that the merchant has to accept Terms of Service and have a U.S. address. Registration of a payment brand suitably entails providing merchant information pertaining to the payment brand necessary to complete a transaction using a payment option of the payment brand to the UMP 112. Merchant information may include, for example, a merchant account identifier of a payment brand. It is contemplated that the merchant information may be stored in a memory, such as the database 156. The merchant information for a payment brand is suitably obtained during application to the payment brand, as discussed above.

In certain embodiments, the third party 110 provides the merchants 104 with the test platform 116 to test against while they are integrating the UMP 112 with their graphical user interface and/or backend systems supporting the graphical user interfaces. The test platform 116 suitably simulates the behavior of the UMP 112 without actually carrying out transactions to completion.

One or more servers 158 connected to the communications network 118 suitably embody the third party 110. Each of the servers 158 includes one or more of a communications unit 160, at least one memory 162, a processor 164, and the like. The communications units 160 allow the servers 158 to interact with other components connected to the communications network 118. The memories 162 generally include computer executable instructions for performing the above-noted functions associated with the third party 110. The processors 164 execute the computer executable instructions on the memories 162. Further, the servers 158 include the UMP 112, the UBP 114, and the test platform 116. Suitably, the UMP 112, the UBP 114, and the test platform 116 are embodied by computer executable instructions stored on computer readable mediums, where the processors 164 execute the computer executable instructions. In some embodiments, the computer readable mediums may be the memory 162.

Figure 2:
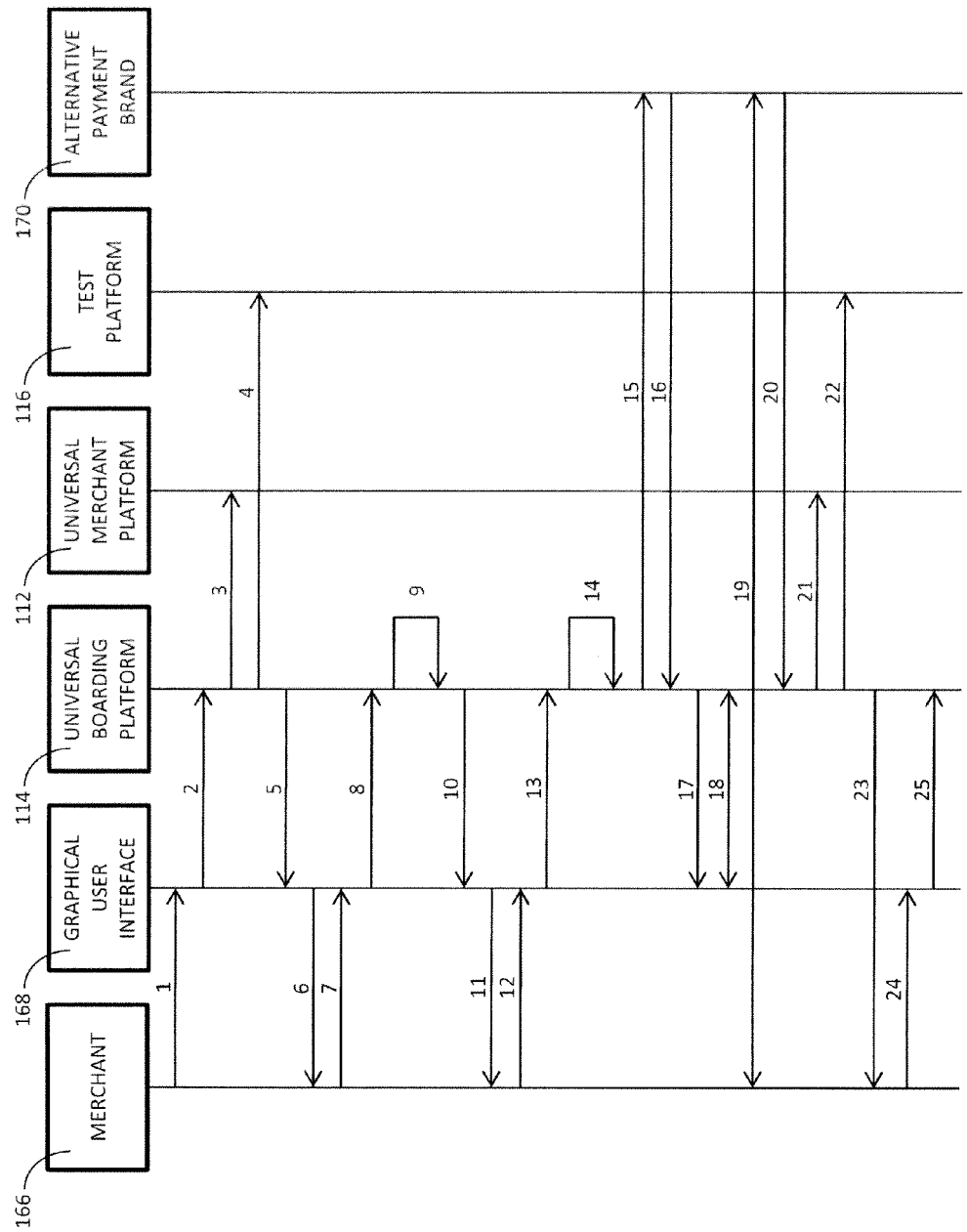
FIG. 2 is a sequence diagram of one embodiment of an application, registration and boarding process according to aspects of the present disclosure; and, FIG. 3 is a sequence diagram of another embodiment of an application, registration and boarding process according to aspects of the present disclosure; and, FIG. 4 is a block diagram of a method for applying to, registering and boarding alternative payment brands according to aspects of the present disclosure.

With reference to FIG. 2, a sequence diagram illustrating the functionality of the UBP 114 according to one embodiment is provided. The sequence diagram includes one 166 of the merchants 104 a graphical user interface 168 serving as a data entry point for the UBP 114, the UBP 114, the UMP 112, the test platform 116, and one 170 of the alternative payment brands 108. However, it is to be understood that the test platform 116 is not necessary to the functionality of the UBP 114. The sequence diagram presupposes that the merchant 166 selects only a single alternative payment brand (i.e., the alternative payment brand 170), but it is to be understood that multiple alternative payment brands can be selected. Actions 14-24 are simply repeated for each of the selected alternative payment brands.

Initially, at Action 1, the merchant 166 accesses the graphical user interface 168 provided by the UBP 114 by way of, for example, a web browser. Therein, the merchant 166 selects the alternative payment brand 170 from a listing of alternative payment brands presented to the merchant 166 via the graphical user interface 168. Further, in certain embodiments, the merchant 166 enters all the necessary merchant information to submit an application for the alternative payment brand 170, such as name, address, etc. When the merchant 166 finishes selecting the alternative payment brand and entering the necessary merchant information, the merchant 166 submits the selection and the necessary merchant information in a merchant boarding request to the UBP 114 via the graphical user interface 168 at Action 2.

Upon receiving the selection and the necessary merchant information, the UBP 114 registers (or boards) the merchant 166 with the UMP 112 and, optionally, the test platform 116 at Actions 3 and 4, respectively, so the merchant 166 can employ the UMP 112 with the consumers 102. Further, the UBP 114 generates a transaction ID and stores the received selection, the transaction ID, and the received merchant information in a record in a memory or database, such as the database 156.

The UBP 114 provides the graphical user interface 168 with a universal resource location (URL) to a page thereof and the transaction ID in, for example, a merchant boarding response at Action 5. When the graphical user interface 168 receives the URL and the transaction ID, it provides the merchant 166 with the transaction ID and redirects the merchant 166 to the URL at Action 6. During the redirect, the merchant 166 provides the transaction ID to the graphical user interface 168 at Action 7, and the graphical user interface 168 submits the transaction ID to the UBP 114 at Action 8. The transaction ID serves to identify the merchant 166.

The UBP 114, upon receiving the transaction ID, determines whether it has all the merchant information necessary to apply to the selected alternative payment brand 170 at Action 9. Such a determination is made through reference to the memory or database identified above. Insofar as further merchant information is necessary, Actions 10 through 13 are typically performed to request the further merchant information necessary. This further merchant information is then stored in the memory or database, as was done for the merchant information initially received, at Action 14.

Once all the necessary merchant information for registering with the alternative payment brand 170 is received, the UBP 114 typically submits a boarding (or application) request automatically to the alternative payment brand 170 at Action 15. However, it is also contemplated that the boarding request is submitted manually. In such embodiments, the UBP 114 marks the transaction for manual processing. The boarding request is suitably specific to the alternative payment brand 170. Responsive to the boarding request, the alternative payment brand 170 returns an acknowledgement as to whether the boarding request was successfully submitted for processing at Action 16. For example, the response may indicate whether all the necessary merchant information has been provided.

After submitting the boarding request, the UBP 114 notifies the merchant 166 of the results thereof via the graphical user interface 168 at Actions 17 and 18. For example, the UBP 114 notifies the merchant 166 that the application process was successfully initiated or that the application process failed. Some time thereafter, the alternative payment brand 170 and the merchant 166 communicate to complete the application process per the underwriting criteria of the alternative payment brand 170 at Action 19. Typically, this is initiated by the alternative payment brand 170 and involves the merchant 166 agreeing to the Terms and Conditions of the alternative payment brand 170. During this time, the UBP 114 remains idle.

Once the underwriting criteria of the alternative payment brand 170 are met, the UBP 114 is notified thereof at Action 20. This notification typically includes the credentials the merchant 166 needs to process transactions through the alternative payment brand 170. Upon receiving the notice, the UBP 114 updates the UMP 112 and/or the test platform 116 to allow the merchant 166 to begin using the alternative payment brand 170 at Actions 21 and 22. In that regard, the UBP 114 provides the credentials to the UMP 112 and/or the test platform 116. Further, the UBP 114 notifies the merchant 116 that the application process is complete and that the alternative payment brand 170 can be employed at Actions 23 through 25.

Figure 3:
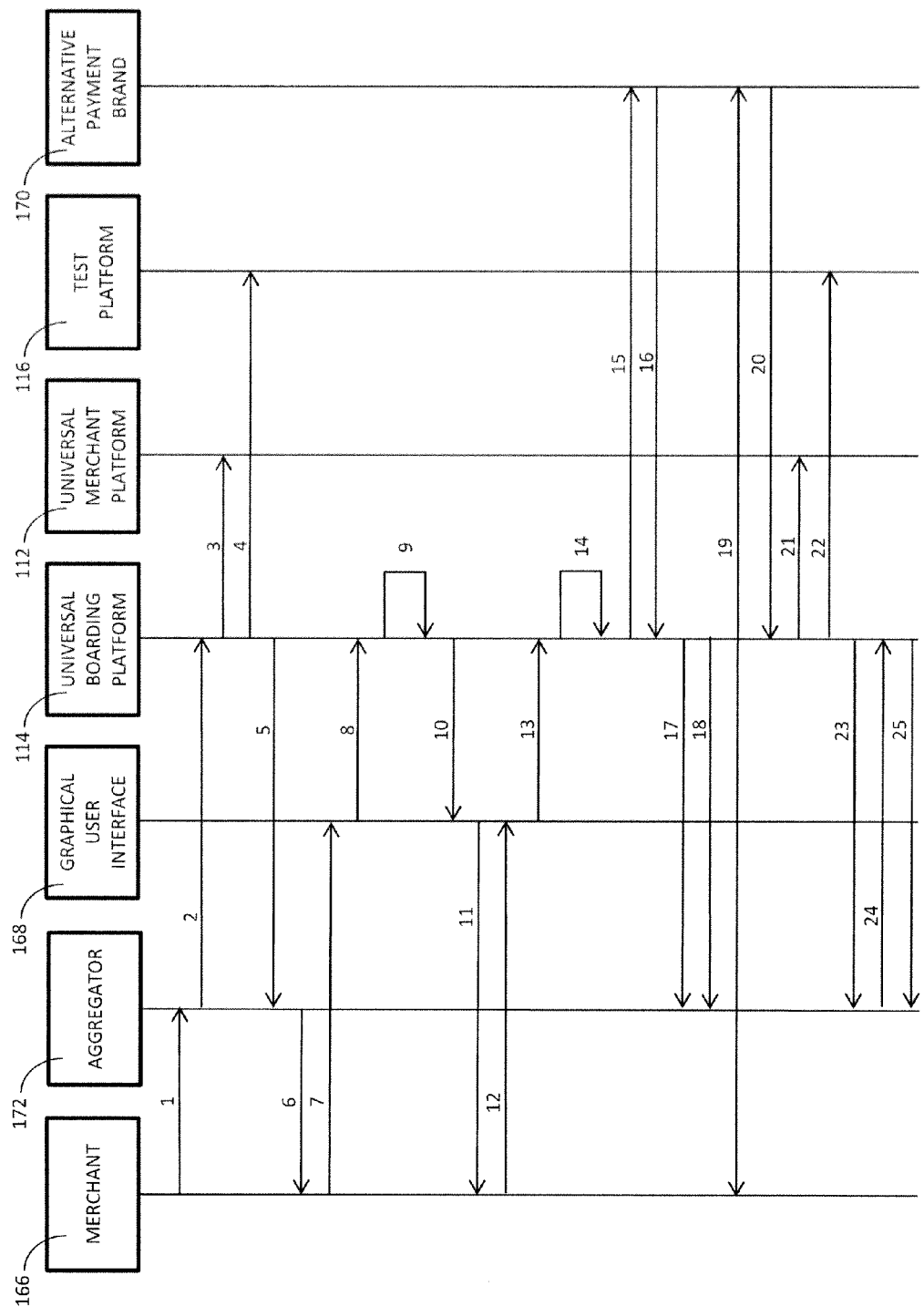

With reference to FIG. 3, a sequence diagram illustrating the functionality of the UBP 114 according to another embodiment is provided. The sequence diagram includes the merchant 166, an aggregator 172, the graphical user interface 168 serving as a data entry point for the UBP 114, the UBP 114, the UMP 112, the test platform 116, and the alternative payment brands 170. However, it is to be understood that the test platform 116 is not necessary to the functionality of the UBP 114. The sequence diagram presupposes that the merchant 166 selects only a single alternative payment brand (i.e., the alternative payment brand 170), but it is to be understood that multiple alternative payment brands can be selected.

Initially, at Action 1, the merchant 166 accesses the aggregator 172 via, for example, a graphical user interface. The merchant 166 selects the alternative payment brand 170 from a listing of alternative payment brands presented to the merchant 166 by the aggregator 172. Further, in certain embodiments, the merchant 166 enters necessary merchant information to submit an application for the alternative payment brand 170, such as name, address, etc. When the merchant 166 finishes selecting the alternative payment brand and entering the necessary merchant information, the aggregator relays the selection and the necessary merchant information to the UBP 114 via, for example, a merchant boarding request at Action 2.

Upon receiving the selection and the necessary merchant information, the UBP 114 registers (or boards) the merchant 166 with the UMP 112 and, optionally, the test platform 116 at Actions 3 and 4, respectively, so the merchant 166 can employ the UMP 112 with the consumers 102. Further, the UBP 114 generates a transaction ID and stores the received selection, the transaction ID, and the received merchant information in a record in a memory or database, such as the database 156.

The UBP 114 provides the aggregator 172 with a universal resource location (URL) to the graphical user interface 168 and the transaction ID in, for example, a merchant boarding response at Action 5. When the aggregator 168 receives the URL and the transaction ID, it provides the merchant 166 with the transaction ID and prompts the merchant 166 to access the URL at Action 6, optionally via a redirect. When the merchant accesses the URL, the merchant 166 provides the transaction ID to the graphical user interface 168 at Action 7, and the graphical user interface 168 submits the transaction ID to the UBP 114 at Action 8. The transaction ID serves to identify the merchant. Actions 9-22 then proceed as described above in connection with FIG. 2. Further, the UBP 114 may notify the aggregator 172 that the application process is complete and that the alternative payment brand 170 can be employed at Actions 23 through 25.

Figure 4:
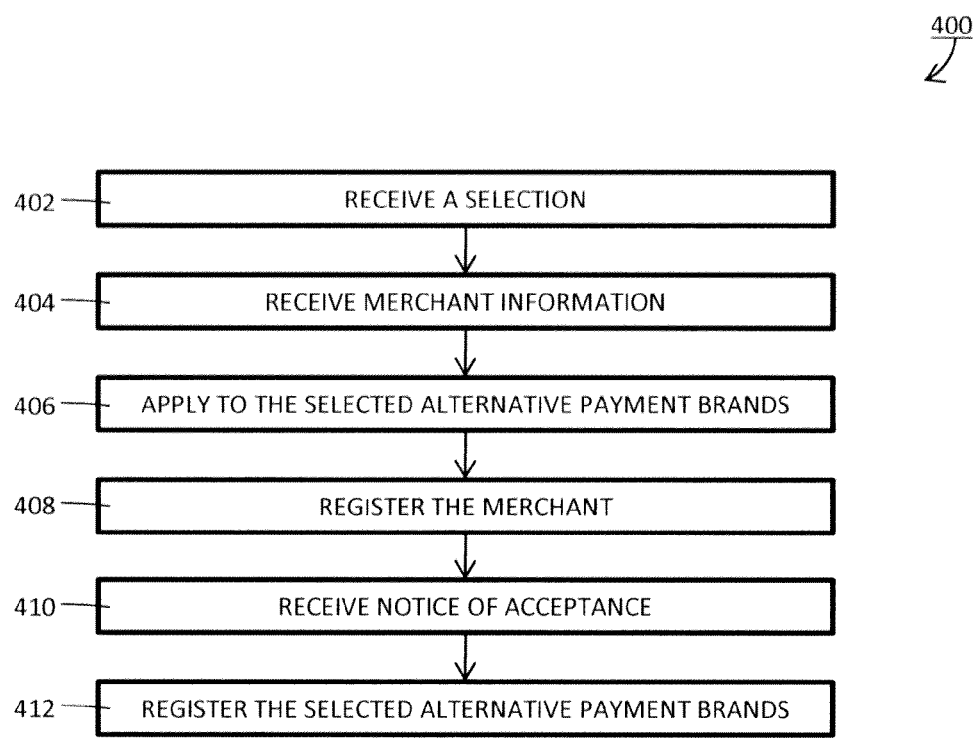

With reference to FIG. 4, a block diagram of an exemplary method 400 for applying to, registering and boarding alternative payment brands is provided. The method 400 is suitably performed by the UBP 114. Initially, a selection 402 of one or more alternative payment brands is received from a merchant. Each of the alternative payment brands includes a different merchant application process. Merchant information from the merchant necessary to apply to the selected alternative payment brands is also received 404. The merchant information is then used to apply 406 to each of the selected alternative payment brands in accordance with the merchant application process for the selected alternative payment brand. In certain embodiments, the method 400 further includes at least one of registering 408 the merchant with the UMP 112 for the merchant, receiving 410 notice that underwriting criteria of the selected alternative payment brands have been accepted, and enabling 412 the selected alternative payment brands with the UMP 112 for the merchant.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C and the like; a user input device includes one or more of a mouse, a keyboard, a touch screen display, one or more buttons, one or more switches, one or more toggles, and the like; a database includes at least one memory; and a display includes one or more of a LCD display, an LED display, a plasma display, a projection display, a touch screen display, and the like.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A system for processing e-commerce transactions, said system comprising:
   a computer with one or more processors and a memory, the computer configured to:
      receive a remote selection of one or more alternative payment brands from a merchant over a communications network, each of said alternative payment brands including a different merchant application process;
      receive merchant information from the merchant necessary to apply to the selected alternative payment brands over the communications network; and,
      automatically apply to each of the selected alternative payment brands over the communications network using the merchant information in accordance with the merchant application process for the selected alternative payment brand;
   wherein the computer is remote from the merchant and the selected alternative payment brands.

2. The system according to claim 1, wherein the processors are further programmed to provide the merchant with a graphical user interface requesting the selection, where the graphical user interface lists a plurality of alternative payment brands supported by a universal merchant platform (UMP), the UMP providing merchants with a unified payment protocol for conducting transactions with the alternative payment brands, each of the alternative payment brands having a different payment protocol for conducting transactions.

3. The system according to claim 1, further including:
   a memory including mappings between alternative payment brands and required fields;
   wherein the processors are further programmed to provide the merchant with a graphical user interface requesting the merchant enter merchant information for each of the required fields of the selected alternative payment brands, as determined by the mappings;
   wherein the merchant information is received from the graphical user interface.

4. The system according to claim 1, wherein the applying includes:
   transmitting an application for each of the selected alternative payment brands to the selected payment brand over a communications network.

5. The system according to claim 1, wherein the applying includes:
   selecting a sub-module for each of the selected alternative payment brands, where the sub-modules implement application logic for corresponding alternative payment brands and provide a unified interface to the application process; and, submitting the merchant information to the sub-modules via the unified interface.

6. The system according to claim 1, wherein the processors are further programmed to:

receive notice that underwriting criteria of the selected alternative payment brands have been met; and, in response to the notice, automatically register the selected alternative payment brands with the UMP for the merchant.

7. The system according to claim 6, wherein the underwriting criteria are defined by one or more rules.

8. The system according to claim 1, wherein the selected alternative payment brands include at least one of GOOGLE, PAYPAL, BILL ME LATER, AMAZON PAYMENTS, and TELECHECK.

9. A method for processing e-commerce transactions, said method carried out by a computer with at least a processor and a memory, and said method comprising:

receiving a remote selection of one or more alternative payment brands from a merchant over a communications network, each of said alternative payment brands including a different merchant application process;

receiving merchant information from the merchant necessary to apply to the selected alternative payment brands over the communication network;

automatically applying to each of the selected alternative payment brands over the communications network using the merchant information in accordance with the merchant application process for the selected alternative payment brand;

registering the merchant with a universal merchant platform (UMP) over the communications network to create a UMP account, the UMP providing merchants with a unified payment protocol for conducting transactions with the alternative payment brands, each of the alternative payment brands having a different payment protocol for conducting transactions;

receiving notice that underwriting criteria of the selected alternative payment brands have been met; and in response to the notice, registering the selected alternative payment brands with the UMP account.

10. The method according to claim 9, further including:

providing the merchant with a graphical user interface requesting the selection, where the graphical user interface lists a plurality of alternative payment brands supported by a universal merchant platform (UMP).

11. The method according to claim 9, further including:

providing the merchant with a graphical user interface requesting the merchant enter data for each of the required fields of the selected alternative payment brands, wherein the required fields are determined by mappings between alternative payment brands and required fields.

12. The method according to claim 11, wherein the merchant information is received from the graphical user interface.

13. The method according to claim 9, wherein the applying includes:

transmitting an application for each of the selected alternative payment brands to the selected payment brand over a communications network.

14. The method according to claim 9, wherein the applying includes:

selecting a sub-module for each of the selected alternative payment brands, where the sub-modules implement application logic for corresponding alternative payment brands and provide a unified interface to the application process; and, submitting the merchant information to the sub-modules via the unified interface.

15. The method according to claim 14, wherein the underwriting criteria are defined by one or more rules.

16. The method according to claim 9, wherein the selected alternative payment brands include at least one of GOOGLE, PAYPAL, BILL ME LATER, AMAZON PAYMENTS, and TELECHECK.

17. One or more processors programmed to perform the method according to claim 9.

18. A non-transitory computer medium carrying software which controls one or more processors to perform the method according to claim 9.

19. A system for processing e-commerce transactions, said system comprising:

a universal merchant platform (UMP) providing merchants with a single interface for processing transactions involving a plurality of different alternative payment brands;

a computer with one or more processors and a memory programmed to:

receive a selection of one or more alternative payment brands from a merchant, each of said alternative payment brands including a different merchant application process;

receive merchant information from the merchant necessary to apply to the selected alternative payment brands;

apply to each of the selected alternative payment brands using the merchant information in accordance with the merchant application process for the selected alternative payment brand;

receive notice that underwriting criteria of the selected alternative payment brands have been accepted; and, register the selected alternative payment brands with the UMP for the merchant.

20. The system according to claim 19, wherein the computer is remote from the merchant and the selected alternative payment brands.

* * * * *